(12) United States Patent
Wang et al.

(10) Patent No.: US 8,774,078 B2
(45) Date of Patent: Jul. 8, 2014

(54) METHOD AND USER EQUIPMENT FOR RECEIVING MULTICAST CONTROL CHANNEL NOTIFICATION MESSAGE

(75) Inventors: Bin Wang, Shenzhen (CN); Zijiang Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 116 days.

(21) Appl. No.: 13/258,882

(22) PCT Filed: Nov. 18, 2010

(86) PCT No.: PCT/CN2010/078897
§ 371 (c)(1),
(2), (4) Date: May 30, 2012

(87) PCT Pub. No.: WO2011/069407
PCT Pub. Date: Jun. 16, 2011

(65) Prior Publication Data
US 2012/0236775 A1  Sep. 20, 2012

(30) Foreign Application Priority Data
Dec. 9, 2009 (CN) .......................... 2009 1 0211970

(51) Int. Cl.
*H04W 4/00* (2009.01)
*H04W 4/06* (2009.01)

(52) U.S. Cl.
CPC . *H04W 4/06* (2013.01); *H04W 4/00* (2013.01)
USPC ............................. 370/313; 370/312; 455/450

(58) Field of Classification Search
CPC .................................. H04W 4/06; H04W 4/00
USPC .................. 370/312, 345–432; 455/450–515
See application file for complete search history.

(56) References Cited

U.S. PATENT DOCUMENTS

2009/0116417 A1 * 5/2009 Hu ................................. 370/312
2011/0243054 A1 * 10/2011 Yi et al. ........................ 370/312

FOREIGN PATENT DOCUMENTS

| CN | 1922803 A | 2/2007 | |
| CN | 1998164 A | 7/2007 | |
| CN | 101296395 A | 10/2008 | |
| GB | EP1850616 A1 * | 4/2006 | ............... H04Q 7/38 |

OTHER PUBLICATIONS

Reliability of MCCH change notification; CMCC; 3GPP TSG-RAN WG2 Meeting #67bis; 5 pages; Oct. 12-Oct. 16, 2009; Miyazaki, Japan.

* cited by examiner

Primary Examiner — Ricky Ngo
Assistant Examiner — Iqbal Zaidi
(74) Attorney, Agent, or Firm — McGarry Bair PC

(57) ABSTRACT

The present invention discloses a method for receiving multicast control channel notification message and user equipment. The method comprises user equipment receiving MCCH notification message for one or more times within the time interval of the modification period MP of the MCCH indicated by the broadcast control channel BCCH when the user equipment acquires that the multimedia broadcast service MBMS service that it is interested in is corresponding to some multicast control channel MCCH; the user equipment receiving MCCH notification message for one or more times within the time interval of the shortest MP of the MCCH MP indicated by the broadcast control channel BCCH when the user equipment cannot acquire that the multimedia broadcast service MBMS service that it is interested in is corresponding to some multicast control channel MCCH. The present invention reduces the times of UE receiving MCCH notification so as to reduce UE power consumption.

14 Claims, 4 Drawing Sheets

METHOD AND USER EQUIPMENT FOR RECEIVING MULTICAST CONTROL CHANNEL NOTIFICATION MESSAGE

CROSS-REFERENCE TO RELATED APPLICATIONS

This application is a National Phase application of International Application No. PCT/CN2010/078897, filed Nov. 18, 2010, which claims the benefit of Chinese Patent Application No. 200910211970.5, filed Dec. 9, 2009, both of which are incorporated herein by reference in their entirety.

TECHNICAL FIELD OF THE PRESENT INVENTION

The present invention relates to the communication field, and in particular, to a method and user equipment for receiving multicast control channel notification message.

BACKGROUND OF THE PRESENT INVENTION

In the long term evolution (LTE) system, the 3rd generation partnership project (3GPP) proposes multimedia broadcast multicast service (MBMS), which may transmit data from one data source to a plurality of targets so as to realize sharing of network (including core network and access network) resource and improve utilization rate of network resource (in particular radio interface resource).

Recently, MBMS service is introduced to the LTE R9 system. It needs the common transmission of control signal and user data to realize the carrying of the MBMS service in the system. In this case, the control signal will notify receiver of corresponding control parameters, in which the receiver may be user equipment (UE) or may be called a terminal. And the control signal will direct the UE to receive the MBMS service (corresponding user data) that it is interested in at the corresponding position. The control signal is transmitted via multicast control channel (MCCH) in LTE R9 system.

MBMS service divides area by multimedia broadcast multicast service single frequency network Area (MBSFN Area), wherein the MBSFN Area is formed by a series of cells. The cells in MBSFN Area may use MBSFN technology for synchronous transmission when transmitting the control signal and user data, such that UE may acquire corresponding combining gain during receiving. A specific cell may be covered by a plurality of MBSFN Areas simultaneously, which is generally called MBSFN Area overlapping. Currently, the cell supports overlapping of one to eight MBSFN Areas. When there is overlapping in a specific cell, the cell may have a plurality of MCCHs simultaneously (for each MBSFN Area is corresponding to one MCCH). Each specific MCCH has MCCH modification period (MP), and in the MCCH MP, the content carried by MCCH is not allowed for modification. In MCCH MP, MCCH information transmits repeatedly, wherein the time interval for transmission is called MCCH repeating period (RP). Transmitting repeatedly in repeating period is mainly to improve the reliability of UE receiving MCCH information. FIG. 1 is a diagram of logic relationship of MCCH MP and MCCP RP according to relative technology. As shown in FIG. 1, in MCCH MP (n), the content transmitted by MCCH may not be modified until the next MCCH MP. MCCH MP denotes repeating transmission of MCCH content in MCCH MP. UE can acquire all MCCHs and the corresponding configuration information (for example, how many MCCHs there are in the cell, corresponding parameter of MP, RP of each MCCH) in the cell via a system information block (SIB) 13 of the broadcast control channel (BCCH). UE has known SIB13 in BCCH before preparing to receive MBMS service.

MBMS service is featured in large data amount of service, long duration during terminal receiving and relatively constant average data rate. These features determine that the schedule and control signal configuration of the MBMS service is semi-static, that is to say, the schedule information and control information of the MBMS service keep unmodified "in a long term" such that in each period of MCCH information system side transmits unmodified information (transmitting all the time because new users may access at any time). If the terminal that has acquired MCCH information receives unmodified MCCH information each time, terminal is power-consumptive. For the amount of MCCH information is large, the receiving and analyzing processes are power-consumptive.

In consideration of the above problems, MBMS notification message (called MCCH change notification, or MBMS notification indicator, or MBMS notification information, or MBMS notification in English; also called MBMS notification message, MBMS notification information or MBMS indication information and so on; hereinafter taking MBMS notification message, MBMS notification information in English as example to describe) is introduced. MBMS notification message uses little amount of information to describe whether there is change between the MCCH information that the next MP will transmit and the MCCH information transmitted in the current MP. UE only needs to monitor little amount of MBMS notification message information, and it determines whether to receive coming MCCH information according to MBMS notification message terminal. The specific transmission position of the MCCH notification message is notified by SIB13 in BCCH.

When there is overlapping in the cell, all MCCHs in the cell may use a common MCCH notification to indicate the modification condition of a plurality of MCCHs. Specifically, MCCH notification may indicate which MCCH or MCCHs is or are modified via the payload, wherein the payload of MCCH notification is 8 bits. It transmits in physical downlink control channel (PDCCH) using downlink control information (DCI) Format 1C. MCCH notification supports eight MCCH instructions at most, wherein which bit of MCCH notification represents which MCCH will be notified by SIB13 in BCCH. MCCH notification is transmitted repeatedly in MCCH MP. The transmitting times may be multi times (also may be once). The main purpose of transmitting MCCH information repeatedly in MCCH MP is to improve the receiving reliability.

Currently, the existing problem is that there is a plurality of MCCHs in the cell when there is overlapping in the cell, and the MPs corresponding to each MCCH are different. Thus, UE cannot determine the MCCH notification is received how many times within how long time interval. Therefore, UE may try to receive MCCH notification repeatedly such that the power consumption is large.

SUMMARY OF THE PRESENT INVENTION

The present invention is proposed aiming at the problem that UE in relative technology cannot determine the MCCH notification is received how many times within how long interval. Therefore, the main purpose of the present invention is to provide a receiving scheme of MCCH notification to solve the above problem.

To realize the above purpose, according to one aspect of the present invention, a method for receiving multicast control channel notification message is provided.

The method for receiving multicast control channel notification message according to the present invention comprises: user equipment receiving MCCH notification message for one or more times within the interval of MCCH MP indicated by the multicast broadcast control channel (BCCH) when the user equipment acquires that a multimedia broadcast multicast service (MBMS service) that it is interested in is corresponding to a certain multicast control channel (MCCH); and the user equipment receiving MCCH notification message for one or more times within the time interval of the shortest MP in MCCH MPs indicated by the broadcast control channel (BCCH) when the user equipment cannot acquire that a multimedia broadcast multicast service (MBMS service) that it is interested in is corresponding to a certain multicast control channel (MCCH).

Preferably, the user equipment receiving the MCCH notification message for one or more times within the time interval of the MP comprises: the user equipment at least receiving the MCCH notification message repeatedly transmitted for a notificationRepetitionCoff times within the time interval of the MP, wherein the notificationRepetitionCoff is the preconfigured times of repeatedly transmitting MCCH notification message within the shortest MP period.

Preferably, the user equipment receiving the MCCH notification message for one or more times within the time interval of the MP comprises: the user equipment stopping receiving the MCCH notification message within the time interval of the MP when the user equipment receives the MCCH notification message corresponding to the MCCH.

Preferably, the user equipment receiving the MCCH notification message for one or more times within the time interval of the shortest MP comprises: the user equipment at least receiving the MCCH notification message for a repeated transmission times of notificationRepetitionCoff times within the time interval of the shortest MP, wherein notificationRepetitionCoff is the preconfigured times of repeatedly transmitting the MCCH notification message within the shortest MP period.

Preferably, the user equipment receiving the MCCH notification message for one or more times within the time interval of the shortest MP comprises: the user equipment stopping receiving the MCCH notification message within the time interval of the shortest MP when the user equipment receives a correct MCCH notification message corresponding to MCCH.

To realize the above purpose, according to another aspect, a user equipment is provided.

The user equipment according to the present invention comprises an acquisition module adapted for acquiring a MCCH MP where the MBMS service that the user equipment expects is located or a shortest MCCH MP in the MCCH MPs indicated by the BCCH; and a receiving module adapted for receiving the MCCH notification message for one or more times within the time interval of the MP.

Preferably, the user equipment further comprises a determination module adapted for determining whether the multimedia broad multicast service (MBMS service) that the user equipment expects is configured on the multicast control channel (MCCH); and the receiving module further adapted for receiving the MCCH notification message for one or more times within the time interval of the MCCH MP when the determination result of the determination module is yes; otherwise, the receiving module further adapted for receiving the MCCH notification message for one or more times within the time interval of the shortest MCCH MP of the MPs indicated by the BCCH.

Preferably, the receiving module at least receives the MCCH notification message for a repeated transmission times of notificationRepetitionCoff times within the time interval of the MP, wherein notificationRepetitionCoff is the times of repeatedly transmitting the MCCH notification message within the preconfigured shortest MP period.

Preferably, the receiving module is further adapted for stopping receiving the MCCH notification message within time interval of the MP when receiving a correct or expected MCCH notification message.

Preferably, the receiving module is further adapted for stopping receiving the MCCH notification message within time interval of the MP when receiving the correct or expected MCCH notification message.

Through the present invention, MP of the MCCH channel where the expected MBMS service is located or MCCH MP with the time interval of the shortest MP indicated by BCCH is acquired by the user equipment, and MCCH notification message is received for one or more times within the time interval of the MP. It solves the problem that UE in relative technology cannot determine the MCCH notification is received how many times within how long time interval, and further reduces the times for which UE receives MCCH notification, so as to reduce UE power consumption. It also avoids the occurrence of the situation in which MCCH is modified but is not found by UE.

Other features and advantages of the present invention will be described in the following specification, and a part of it becomes apparent in the specification, or it can be understood by carrying out the present invention. The purpose and other advantages of the present invention may be realized and acquired by the structure particularly indicated in the written specification, claims and drawings.

BRIEF DESCRIPTION OF THE DRAWINGS

The drawings described herein are to provide a further explanation of the present invention, and form a part of the application. The schematic embodiment of the present invention and the specification are for explaining the present invention, but not for limiting the present invention. In the drawings.

DETAILED DESCRIPTION OF THE EMBODIMENTS

It should be noted that the embodiment in the application and the features in the embodiment may be combined with each other if there is no confliction. The present invention will be explained in details hereinafter with reference to the drawings and combined with the embodiments.

In the following embodiments, the steps shown in the flowchart of the drawings can be executed in the computer system of computer executable instructions. And though logic order is shown in the flowchart, the shown or described steps may be executed in the order different from it in some conditions.

The following embodiments relate to LTE system (but not limited to this), in particular to a method for receiving the service notification message of multimedia broadcast multicast service (MBMS) in the multimedia broadcast multicast service single frequency network (MBSFN) area.

To describe the embodiments of the present invention in details, first the process of the transmitter transmits the MCCH notification is described.

Network side transmits the specific occasion of the MCCH notification by a two-level system (the radio frame level and the subframe level). It is described in details hereinafter.

The radio frame level follows the following formula:

$$SFN \bmod \frac{\min(MCCH1\ MP, MCCH2\ MP, MCCH3\ MP \ldots MCCHn\ MP)}{notificationRepetitionCoeff} = notificationOffset$$

where, SFN is system frame number; MCCHn MP indicates the time length of corresponding modification period of each MCCH in the cell; the notificationRepetitionCoff indicates the times of repeated transmission of MCCH notification information (that is MCCH notification) in the modification period; and the notificationOffset indicates offset amount of the radio frame where the MCCH notification information transmission is located. The subframe level notifies which subframe transmits MCCH notification information in the radio frame via notification subframe.

Figure 1:
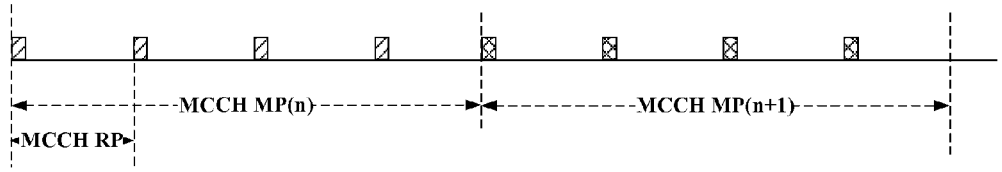
FIG. 1 is a diagram of the logic relationship of MCCH MP and MCCP RP according to relative technology.
Figure 2:
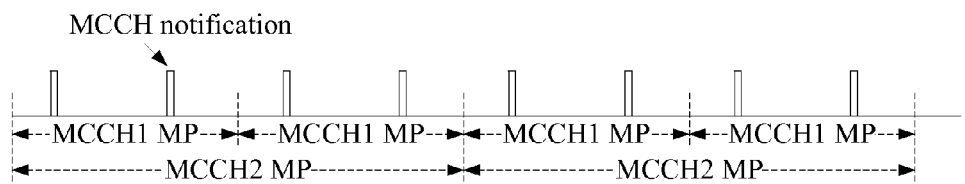
FIG. 2 is a diagram of transmission of MCCH notification by the network side according to the embodiment of the present invention.

The network side notifies UE of the above parameters via the system message or MCCH message. FIG. 2 is a diagram of transmission of MCCH notification at network side according to the embodiment of the present invention. As shown in FIG. 2, the network side may transmit MCCH notification according to the above formula. Accordingly, the network side may notify UE of these parameters via SIB13 of BCCH.

UE acquires the corresponding parameters (such as, MCCH MP, notificationRepetitionCoff, notificationOffset, notification subframe) via SIB 13. With these parameters, the specific MCCH notification transmission occasion at the network side (such as base station) may be calculated using the formula. UE may acquire MP of the MCCH channel where the MBMS service that the user equipment is interested in (or called "expects") is located or the shortest MCCH MP of MCCH MPs indicated by BCCH, and receive the MCCH notification message for one or more times within the time interval of the MP.

Preferably, when the UE knows the MCCH where the MBMS service that it is interested in is located, it acquires the MP of the MCCH. Otherwise, the UE acquires the MCCH MP with the shortest MP of the MCCH MPs indicated by BCCH.

Figure 4:
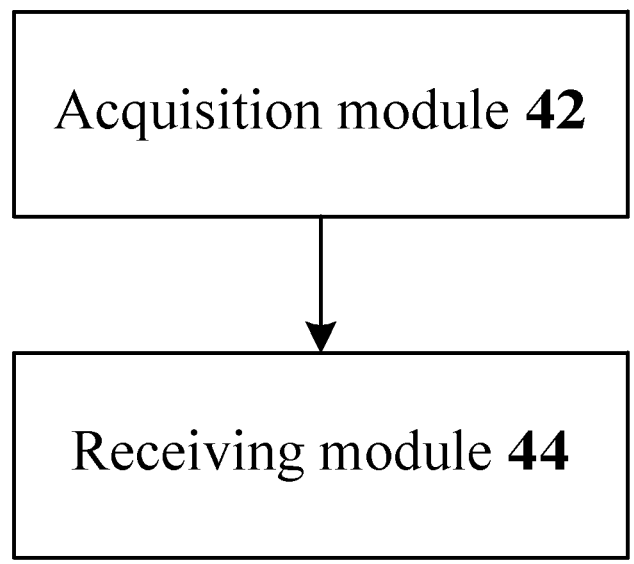
FIG. 4 is a diagram of the user equipment according to the embodiment of the present invention.

This embodiment further provides a user equipment. FIG. 4 is a diagram of the user equipment according to the embodiment of the present invention. As shown in FIG. 4, the user equipment comprises: an acquisition module 42 and a receiving module 44. The structure is described hereinafter.

The acquisition module 42 is adapted for acquiring the MP of the MCCH where the expected MBMS service is located or the MCCH MP of the shortest MP indicated by BCCH; the receiving module 44 is connected to the acquisition module 42 and is adapted for receiving MCCH notification message for one or more times within the time interval of the MP.

Figure 5:
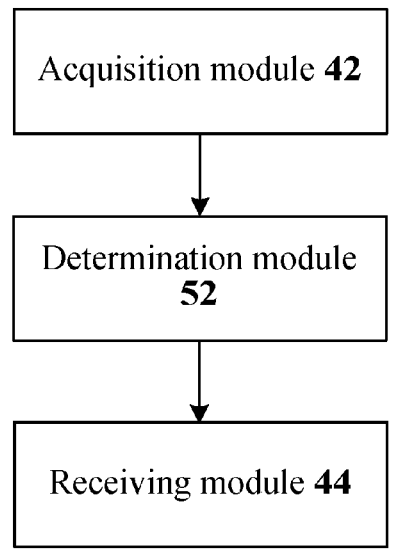
FIG. 5 is a preferred diagram of the user equipment according to the embodiment of the present invention.

FIG. 5 is a preferred diagram of the user equipment according to the embodiment of the present invention. As shown in FIG. 5, the user equipment further comprises a determination module 52 adapted for determining whether the multimedia broad multicast service MBMS service that the user equipment expects is configured on the multicast control channel MCCH; a receiving module 44 adapted for receiving MCCH notification message for one or more times within the time interval of the MP of the MCCH configured with MBMS service that the user equipment expects when the determination result of the determination module 52 is yes; otherwise, the receiving module 44 is adapted for receiving MCCH notification message for one or more times within the time interval of the MCCH MP of the shortest MP indicated by BCCH.

Preferably, the receiving module 44 at least receives the MCCH notification message for a repeated transmission times of notificationRepetitionCoff times within the time interval of the MP; and preferably, the receiving module 44 is further adapted for stopping receiving the MCCH notification message within time interval of the MP when receiving correct or expected MCCH notification message.

Figure 3:
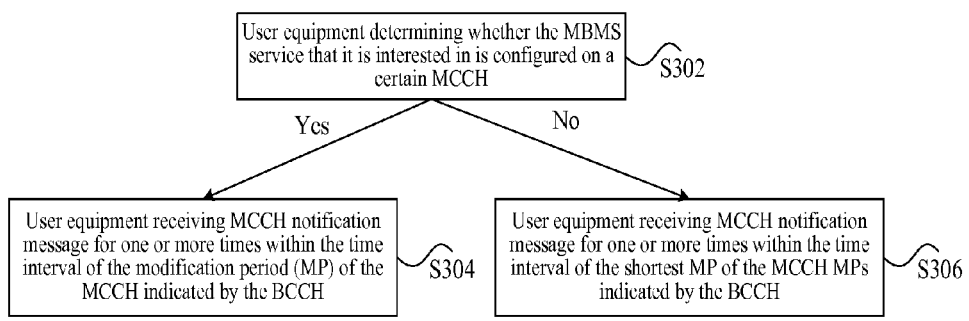
FIG. 3 is a flowchart of the receiving method of MCCH notification according to the embodiment of the present invention.

In this embodiment, UE may select different times of receiving MCCH notification according to different status. FIG. 3 is a flowchart of the receiving method of MCCH notification according to the embodiments of the present invention. As shown in FIG. 3, the flow comprises the following Step S302 to Step S306.

Step S302, the user equipment determining whether the MBMS service that it is interested in (or called "expects") is configured on some MCCH (that is, the user equipment determining that the multicast control channel (MCCH) is configured with the multimedia broadcast multicast service (MBMS service) that the user equipment expects).

Step S304, if the user equipment determines that a certain MCCH is configured with the MBMS service that the user expects, the user equipment receiving the MCCH notification message for one or more times within the time interval of the modification period (MP) of the MCCH indicated by BCCH.

Step S306, otherwise, (that is, the user equipment determining that the multicast control channel (MCCH) is not configured with the multimedia broadcast multicast service (MBMS service) that the user equipment expects), the user equipment receiving MCCH notification message for one or more times within the time interval of the shortest MP of the MCCH MPs indicated by BCCH.

Preferably, during execution, when knowing that the MBMS service that it is interested in is configured on a certain MCCH, the UE receives MCCH notification message for one or more times within the time interval of the MP of the MCCH. Preferably, UE may stop receiving MCCH notification within the MP of MCCH once UE correctly receives the MCCH notification corresponding to the MCCH that it is interested in. Preferably, UE may at least receive the MCCH notification for notificationRepetitionCoff times within the MCCH MP. For example, UE may at least receive MCCH notification for notificationRepetitionCoff times when UE does not correctly receive the MCCH notification corresponding to the MCCH that it is interested in.

Except for the above (for example, UE has not received MBMS service and does not know the MBMS service that it is interested in), UE may receive MCCH notification message for one or more times within the time interval of shortest MP of the MCCHs indicated by the broadcast control channel (BCCH); preferably, if UE correctly receives the MCCH notification, UE may stop receiving MCCH notification within the MCCH MP (the shortest MP); and preferably, the MCCH notification is received for at least notificationRepetitionCoff times in the shortest MCCH MP.

It should be noted that determining which MCCH notifications in the modification period are received is implemented by the UE.

Hereinafter, description will be given in conjunction with preferred embodiments.

First Preferred Embodiment

This embodiment describes the application in the situation of one cell being overlapped by a plurality of MBSFN areas simultaneously. There are two MCCHs in the cell, that is, the cell is the overlapping area of two MBSFN areas. The corresponding parameters of two MCCHs are that the modification period of MCCH1 is 5.12 s, and the modification period of MCCH2 is 10.24 s; the common parameters of MCCH notification are notificationRepetitionCoff=2, and notificationOffset=3; and the subframe level parameter: notification subframe=#1 subframe.

Transmitter

The network side transmits MCCH notification at the corresponding subframe of the radio frame that satisfies the formula:

$$SFN \bmod \frac{\min(MCCH1\ MP, MCCH2\ MP, MCCH3\ MP\ \ldots\ MCCHn\ MP)}{notificationRepetitionCoeff} = notificationOffset$$

According to the specific parameters given in this embodiment, the network side will transmit the MCCH notification information at the subframe satisfying SFN mod 256=3 and #1.

Receiver

Figure 6:
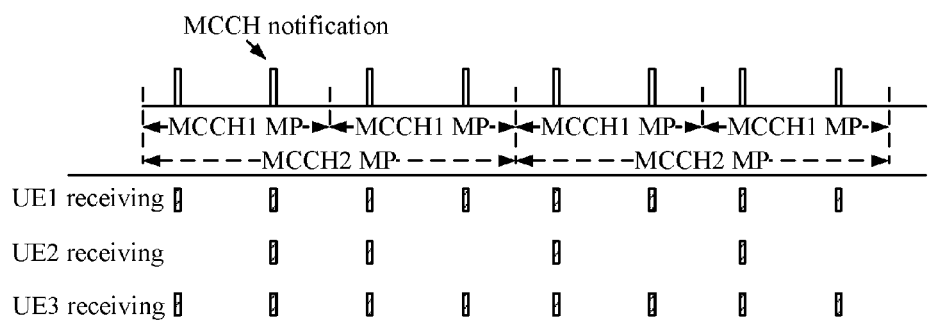
FIG. 6 is a diagram of UE receiving MCCH notification in a first preferred embodiment according to the embodiment of the present invention.

FIG. 6 is a diagram of UE receiving MCCH notification according to the first preferred embodiment of the embodiments in the present invention. This embodiment is described hereinafter in details in combination with FIG. 6.

UE calculates the occasion of transmitting MCCH notification at network side according to different MCCH MP, notificationRepetitionCoff, notificationOffset, and notification subframe.

In the embodiment, UEs in different status have different occasions of receiving MCCH notification. It is described in details hereinafter.

UE1

The UE knows that the service it is interested in is on MCCH1, and receives MCCH notification for one or more times within the modification period according to the MP length 5.12 s of MCCH1. Preferably, UE may at least receive MCCH notification for notificationRepetitionCoff=2 times in the modification period.

Preferably, if UE has not received the MCCH notification corresponding to MCCH that it is interested in, then considering that the Transmitter has only transmitted for notificationRepetitionCoff=2 times, UE1 will receive all the transmitted MCCH notifications. Preferably, determining which MCCH notifications in the modification period are received is implemented by the UE. Considering that UE1 in the embodiment will receive all the MCCH notifications, there is no range for UE1 to select from.

UE2

The UE knows that the service it is interested in is on MCCH2, and receives the MCCH notification for one or more times within the modification period according to the MP length 10.24 s of MCCH2. Preferably, the UE may at least receive MCCH notification for notification RepetitionCoff=2 times in the modification period.

Preferably, if UE has not received the MCCH notification corresponding to MCCH that it is interested in, then considering that the Transmitter has transmitted MCCH notification in the MCCH2 modification period for four times, UE2 may select at least notificationRepetitionCoff=2 times to receive the MCCH notification within the four times. Preferably, determining which MCCH notifications in the modification period are received is implemented by the UE.

UE3

The UE does not know on which MCCH is the service it is interested in. It takes the shortest MCCH modification period in the cell as the basis, thus based on min (5.12 s, 10.24 s)=5.12 s, in the modification period of 5.12 s, the UE receives MCCH notification for one or more times. Preferably, UE may at least receive MCCH notification for notificationRepetitionCoff=2 times therein.

Preferably, if UE has not received the MCCH notification, then considering that the Transmitter has only transmitted for notificationRepetitionCoff=2 times, UE3 will receive all the transmitted MCCH notification. Preferably, determining which MCCH notifications in the modification period are received is implemented by the UE. Considering that UE3 in the embodiment will receive all MCCH notifications, there is no range for UE3 to select from.

Second Preferred Embodiment

This embodiment describes the situation of the application of one cell being overlapped by a plurality of MBMSFN areas simultaneously. There are two MCCHs in the cell, that is, the cell is the overlapping area of two MBSFN areas. The corresponding parameters of two MCCHs are that the modification period of MCCH1 is 10.24 s, and the modification period of MCCH2 is 10.24 s; the common parameters of MCCH notification are notificationRepetitionCoff=2, and notificationOffset=2; and the subframe level parameter: notification subframe=#2 subframe.

Transmitter

According to the current technology, the network side transmits MCCH notification at the corresponding subframe of the radio frame that satisfies the formula:

$$SFN \bmod \frac{\min(MCCH1\ MP, MCCH2\ MP, MCCH3\ MP\ \ldots\ MCCHn\ MP)}{notificationRepetitionCoeff} = notificationOffset$$

According to the specific parameters given in this embodiment, the network side will transmit MCCH notification information at the subframe satisfying SFN mod 512=2 and #2.

Receiver

Figure 7:
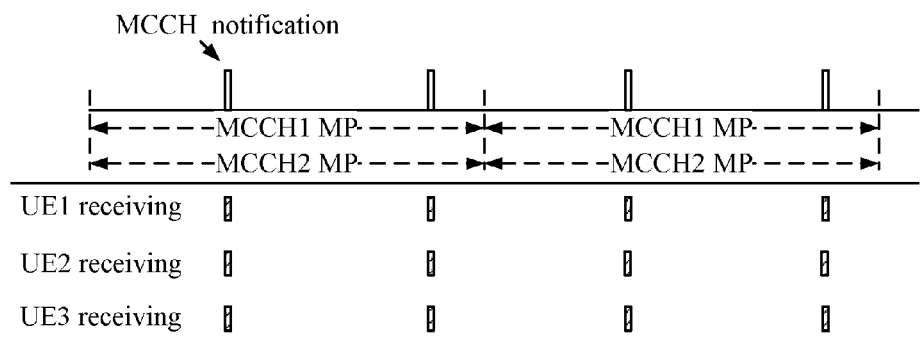
FIG. 7 is a diagram of UE receiving MCCH notification in a second preferred embodiment according to the embodiment of the present invention.

FIG. 7 is the diagram of UE receiving MCCH notification according to the second preferred embodiment of the embodiments in the present invention. This embodiment is described in details hereinafter in combination with FIG. 7.

UE calculates the occasion of transmitting MCCH notification at network side according to different MCCH MP, notificationRepetitionCoff, notificationOffset, and notification subframe.

In this embodiment, UEs in different status have different occasions of receiving MCCH notification. It is described in details hereinafter.

UE1

The UE knows that the service it is interested in is on MCCH1, and receives MCCH notification for one or more times within the modification period according to the MP length 10.24 s of MCCH1. Preferably, UE may at least receive MCCH notification for notificationRepetitionCoff=2 times in the modification period.

Preferably, if UE has not received the MCCH notification corresponding to MCCH it is interested in, then considering that the Transmitter has only transmitted for notificationRepetitionCoff=2 times, UE1 will receive all the transmitted MCCH notifications. Preferably, determining which MCCH notifications in the modification period are received is implemented by the UE. Considering that UE1 in the embodiment will receive all MCCH notifications, there is no range for UE1 to select from.

UE2

The UE knows that the service it is interested in is on MCCH2, and receives MCCH notification for one or more times within the modification period according to the MP length 10.24 s of MCCH2. Preferably, the UE may at least receive MCCH notification for notification RepetitionCoff=2 times in the modification period.

Preferably, if UE has not received the MCCH notification corresponding to MCCH it is interested in, then considering that the Transmitter has only transmitted for notificationRepetitionCoff=2 times, UE2 will receive all the transmitted MCCH notifications. Preferably, determining which MCCH notifications in the modification period are received is implemented by the UE. Considering that UE2 in the embodiment will receive all MCCH notifications, there is no range for UE2 to select from.

UE3

The UE does not know on which MCCH is the service it is interested in. It takes the shortest MCCH modification period in the cell as the basis, thus based on min (10.24 s, 10.24 s)=10.24 s, the UE receives MCCH notification for one or more times therein. Preferably, within 10.24 s, UE may at least receive MCCH notification information for notificationRepetitionCoff=2 times.

Preferably, if UE has not received the MCCH notification, then considering that the Transmitter has only transmitted for notificationRepetitionCoff=2 times, UE3 will receive all the transmitted MCCH notifications. Preferably, determining which MCCH notifications in the modification period are received is implemented by the UE. Considering that UE3 in the embodiment will receive all MCCH notifications, there is no range for UE3 to select from.

Third Preferred Embodiment

In this embodiment, application without occurrence of overlapping is described. There is only one MCCH, that is, there is no overlapping of MBSFN area in the cell. The corresponding parameter of MCCH is that the modification period of MCCH is 5.12 s; the common parameters of MCCH notification are notificationRepetitionCoff=2, and notificationOffset=3; and the subframe level parameter: notification subframe=#1 subframe.

Transmitter

According to the current technology, the network side transmits MCCH notification at the corresponding subframe of the radio frame that satisfies the formula:

$$SFN \bmod \frac{\min(MCCH1\ MP, MCCH2\ MP, MCCH3\ MP\ ...\ MCCHn\ MP)}{notificationRepetitionCoeff} = notificationOffset$$

According to the specific parameters given in this embodiment, the network side will transmit MCCH notification information at the subframe satisfying SFN mod 256=3 and #1.

Receiver

Figure 8:
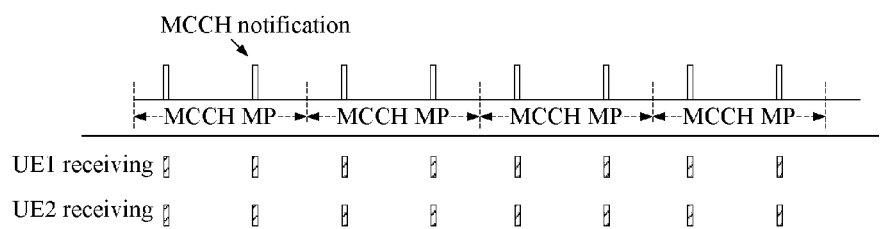
FIG. 8 is a diagram of UE receiving MCCH notification in a third preferred embodiment according to the embodiment of the present invention.

FIG. 8 is the diagram of UE receiving MCCH notification according to the third preferred embodiment of the embodiments in the present invention. The embodiment is described in details hereinafter in combination with FIG. 8.

UE calculates the occasion of transmitting MCCH notification at network side according to MCCH MP, notificationRepetitionCoff, notificationOffset, and notification subframe.

In the embodiment, UEs in different status have different occasions of receiving MCCH notification. It is described in details hereinafter.

UE1

The UE knows that the service it is interested in is on MCCH, and receives MCCH notification for one or more times within the modification period according to the MP length 5.12 s of MCCH. Preferably, the UE may at least receive MCCH notification for notificationRepetitionCoff=2 times in the modification period.

Preferably, if UE has not received the MCCH notification, then considering that the Transmitter has only transmitted for notificationRepetitionCoff=2 times, UE1 will receive all the transmitted MCCH notification. Preferably, determining which MCCH notifications in the modification period are received is implemented by the UE. Considering that UE1 in the embodiment will receive all MCCH notifications, there is no range for UE1 to select from.

UE2

The UE does not know on which MCCH is the service it is interested in. It takes the shortest MCCH modification period in the cell as the basis, thus based on min (5.12 s)=5.12 s, the UE receives MCCH notification for one or more times in this modification period. Preferably, the UE will at least receive MCCH notification for notificationRepetitionCoff=2 times.

Preferably, if UE has not received the MCCH notification, then considering that the Transmitter has only transmitted for notificationRepetitionCoff=2 times, UE2 will receive all the transmitted MCCH notifications. Preferably, determining which MCCH notifications in the modification period are received is implemented by the UE. Considering that UE2 in the embodiment will receive all MCCH notifications, there is no range for UE2 to select from.

As stated above, according to the embodiments, different actions of different UEs receiving MBMS notification are realized by distinguishing different UE status. It reduces some of UE's receiving MCCH notification so as to reduce UE power consumption. Furthermore, for the UE that receives no MBMS service and does not know which service it is interested in, it takes the shortest MCCH modification period in the cell as the basis, and MCCH notification information is received for notificationRepetitionCoff or more times therein. In such a state, the occurrence that the UE does not find that MCCH has been modified is prevented.

Obviously, the technicians in the field should know that each module or each step in the present invention can be realized by general calculating device, which can be gathered on an individual calculating device, or distributed on the network formed by a plurality of calculating devices. Alternatively, they can be realized by the program code executed by the calculating device such that they can be stored in the storage device for execution by the calculating device, or they can be fabricated into each integrated circuit, or the plurality of modules or steps are made into individual integrated circuit. In such a way, the present invention is not limited to the combination of any specific hardware and software.

The above is only the preferred embodiments of the present invention, but not limited to the present invention. To those skilled in the art, many modifications and changes can be made to the present invention. Any modifications, equivalent replacements, improvements and the like within the spirit and principle of the present invention shall fall within the scope of protection of the present invention.

What is claimed is:

1. A method for receiving multicast control channel notification message, comprising:
    when a user equipment acquires that a multimedia broadcast multicast service (MBMS service) that the user equipment is interested in is corresponding to a certain multicast control channel (MCCH), the user equipment receiving the MCCH notification message for one or more times within a time interval of a modification period (MP) of the MCCH indicated by a broadcast control channel (BCCH); and
    when the user equipment cannot acquire that the multimedia broadcast service (MBMS service) that the user equipment is interested in is corresponding to a certain multicast control channel (MCCH), the user equipment receiving the MCCH notification message for one or more times within the time interval of a shortest MP of MCCH MPs indicated by the broadcast control channel (BCCH);
    wherein the user equipment determining whether the multimedia broadcast multicast service that the user equipment expects is configured on the MCCH; and
    the user equipment receiving the MCCH notification message for one or more times within the time interval of the MCCH MP when the determination result is yes; otherwise, the user equipment receiving the MCCH notification message for one or more times within the time interval of the shortest MCCH MP of the MPs indicated by the BCCH.

2. The method according to claim 1, wherein the user equipment receiving the MCCH notification message for one or more times within the time interval of the MP comprises:
    the user equipment at least receiving the MCCH notification message for a repeated transmission times of notificationRepetitionCoff times within the time interval of the MP, wherein the notificationRepetitionCoff is the preconfigured times of repeatedly transmitting the MCCH notification message within the shortest MP period.

3. The method according to claim 2, wherein the user equipment receiving the MCCH notification message for one or more times within the time interval of the MP comprises:
    the user equipment stopping receiving the MCCH notification message within the time interval of the MP when the user equipment receives the MCCH notification message corresponding to the MCCH.

4. The method according to claim 1, wherein the user equipment receiving the MCCH notification message for one or more times within the time interval of the MP comprises:
    the user equipment stopping receiving the MCCH notification message within the time interval of the MP when the user equipment receives the MCCH notification message corresponding to the MCCH.

5. The method according to claim 1, wherein the user equipment receiving the MCCH notification message for one or more times within the time interval of the shortest MP comprises:
    the user equipment at least receiving the MCCH notification message for a repeated transmission times of notificationRepetitionCoff times within the time interval of the shortest MP, wherein the notificationRepetitionCoff is the preconfigured times of repeatedly transmitting the MCCH notification message within the shortest MP period.

6. The method according to claim 5, wherein the user equipment receiving the MCCH notification message for one or more times within the time interval of the shortest MP comprises:
    the user equipment stopping receiving the MCCH notification message within the time interval of the shortest MP when the user equipment receives a correct MCCH notification message corresponding to the MCCH.

7. The method according to claim 1, wherein the user equipment receiving the MCCH notification message for one or more times within the time interval of the shortest MP comprises:
    the user equipment stopping receiving the MCCH notification message within the time interval of the shortest MP when the user equipment receives a correct MCCH notification message corresponding to the MCCH.

8. A user equipment, comprising:
    an acquisition module, adapted for acquiring a MP of a MCCH where a multimedia broadcast multicast service (MBMS service) that the user equipment expects is located or a shortest MCCH MP of MCCH MPs indicated by a broadcast control channel (BCCH); and
    adapted for receiving a MCCH notification message for one or more times within the time interval of the MP;
    a determination module, adapted for determining whether the multimedia broadcast multicast service (MBMS service) that the user equipment expects is configured on the multicast control channel (MCCH); and
    the receiving module further adapted for receiving the MCCH notification message for one or more times within the time interval of the MCCH MP when the determination result of the determination module is yes; otherwise, the receiving module further adapted for receiving the MCCH notification message for one or more times within the time interval of the shortest MCCH MP of the MPs indicated by the BCCH.

9. The user equipment according to claim 8, wherein the receiving module at least receives the MCCH notification message for a repeated transmission times of notification-RepetitionCoff times within the time interval of the MP, wherein the notificationRepetitionCoff is the preconfigured times of repeatedly transmitting the MCCH notification message within the shortest MP period.

10. The user equipment according to claim 9, wherein the receiving module is further adapted for stopping receiving the MCCH notification message within the time interval of the MP when receiving the correct or expected MCCH notification message.

11. The user equipment according to claim 8, wherein the receiving module is further adapted for stopping receiving the MCCH notification message within the time interval of the MP when receiving a correct or expected MCCH notification message.

12. The user equipment according to claim 8, wherein the receiving module at least receives the MCCH notification message for a repeated transmission times of notificationRepetitionCoff times within the time interval of the MP, wherein the notificationRepetitionCoff is the preconfigured times of repeatedly transmitting the MCCH notification message within the shortest MP period.

13. The user equipment according to claim 12, wherein the receiving module is further adapted for stopping receiving the MCCH notification message within the time interval of the MP when receiving the correct or expected MCCH notification message.

14. The user equipment according to claim 8, wherein the receiving module is further adapted for stopping receiving the MCCH notification message within the time interval of the MP when receiving a correct or expected MCCH notification message.

* * * * *